E. SIEGEL & M. J. CANTOR.
TIRE FOR VEHICLES.
APPLICATION FILED SEPT. 29, 1910.
998,127.
Patented July 18, 1911.
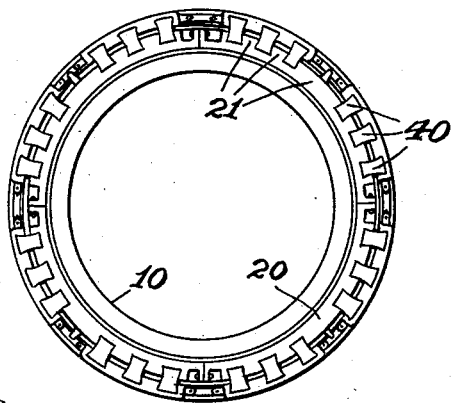
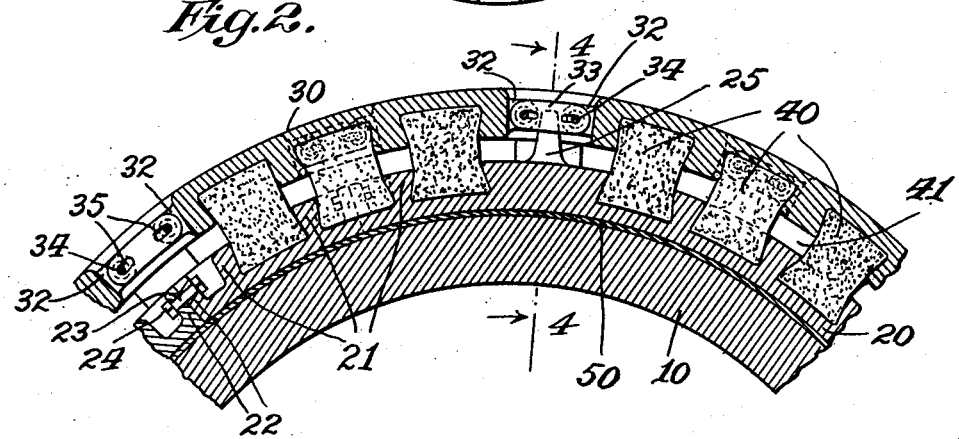
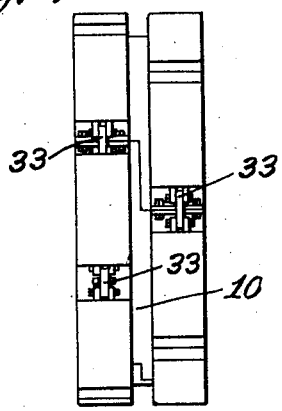
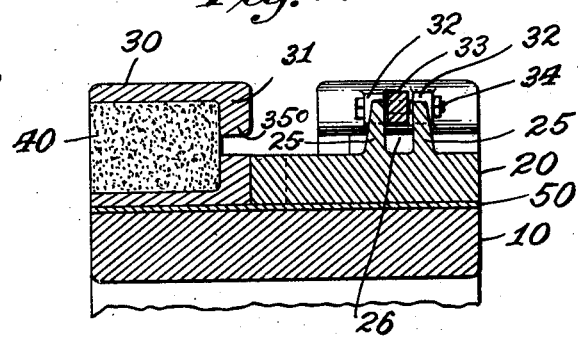
Witnesses:
Edna A. Moreland
Alan C. McDonnell
Inventors
Ernest Siegel and
Michael J. Cantor,
By William R. Baird
their attorney

UNITED STATES PATENT OFFICE.

ERNEST SIEGEL AND MICHAEL J. CANTOR, OF NEW YORK, N. Y., ASSIGNORS OF FIFTY-ONE ONE-HUNDREDTHS TO JACOB RUPPERT, JR., TWENTY-FOUR AND ONE-HALF ONE-HUNDREDTHS TO ERNEST SIEGEL, AND TWENTY-FOUR AND ONE-HALF ONE-HUNDREDTHS TO MICHAEL J. CANTOR, ALL OF NEW YORK, N. Y.

TIRE FOR VEHICLES.

998,127.  Specification of Letters Patent.  Patented July 18, 1911.

Application filed September 29, 1910. Serial No. 584,433.

*To all whom it may concern:*

Be it known that we, ERNEST SIEGEL and MICHAEL J. CANTOR, citizens of the United States, residing at New York, in the county of New York and State of New York, have invented certain new and useful Improvements in Tires for Vehicles, of which the following is a specification.

Our invention relates to tires for vehicles and the like and particularly to self propelled trucks adapted to carry heavy loads.

In use with vehicles of the kind described both solid and pneumatic tires have disadvantages, the former are too inelastic and the latter too elastic. If the treading surface is soft it is apt to wear away rapidly and if it is unyielding it is apt to induce an unpleasant or even destructive amount of vibration in the vehicle.

The object of our invention is to produce a tire designed for use upon heavy trucks which will have a rigid hard treading surface not apt readily to wear out under reasonable usage and which will also at the same time be reasonably elastic and capable of absorbing usual shocks and vibrations.

In the drawings, Figure 1 is a side elevation in miniature of a wheel embodying one form of our invention, Fig. 2 is a vertical fragmentary section of the same, Fig. 3 is an edge view of a pair of tires mounted side by side upon the same axle and Fig. 4 is a transverse section on the plane of the line 4—4 in Fig. 2.

In the drawings 10 is the felly of a wheel made of any suitable size and material and adapted to receive spokes or to be otherwise adapted to support the framework of a suitable vehicle in any usual manner. Encircling this felly is an inner rim 20 preferably made of sections of cast steel, or other suitable material, and provided with outwardly radially projecting cross pieces or flanges 21, arranged symmetrically and in series around the rim. Each cross piece is preferably provided with reëntrant or inwardly sloping sides which form the walls of dovetail recesses adapted to receive cushions or resilient elements shown in the form of the invention illustrated as blocks 40 of soft rubber, having the form of a double wedge with its bases turned in opposite directions. The sections of which this inner rim is composed may be of any convenient number. In the form illustrated there are shown four quadrants. Means are provided for securely holding the sections together firmly to encircle the felly. We prefer as such means adjacent flanges 22 adapted to be connected together by bolts 23 and nuts 24 but do not confine ourselves to the particular connecting means illustrated, as any usual means may be employed. At intervals, the flanges 21 are made circularly wider than elsewhere and at such places they are provided with pairs of radially projecting fins or lugs 25 having a space 26 between them.

Arranged concentrically around the inner rim 20 is an outer treading rim 30 made preferably of sections of cast steel, or other suitable material, and provided with inwardly radially projecting cross pieces or flanges 31 arranged symmetrically and in series around the rim, and registering with the outwardly radially projecting cross pieces or flanges 21 of the inner rim 20. Each cross piece 31 is preferably provided with reëntrant or inwardly sloping sides which form the walls of dovetail recesses adapted to receive the cushions or resilient elements 40 above referred to.

The sections of the outer rim may be of any convenient number. In the form illustrated there are eight shown. Means are provided to make a flexible connection between each adjacent pair. In the form illustrated this consists of a forked lug indicated at 32 projecting from each section and a connecting link 33 fitting within the prongs of two such forks to each of which it is joined by a cross bolt 34. The apertures in the link adapted to receive such bolts 34 are slightly elongated as shown at 35 in Fig. 2 to permit of a slight play at the connecting points, so as to allow the adjoining sections of the outer rim to move slightly with respect to each other. When assembled it is intended that the links 33 connecting the sections of the outer rim together should come between the fins or lugs 25 on the inner rim. This is to prevent the lateral displacement of the outer rim with respect to the inner rim. The outer rim is also provided on its inner edge with an inturned annular flange indicated at 35.

While arranged concentrically it is preferred that there should be a substantial space 41 between the outer and inner rims. This is bridged in part by the cushions 40 but allows to the different sections of the outer rim some inwardly radial movement before contacting with the inner rim, and it is preferred that the cushions 40 should be of such size and material that no actual contact should take place under ordinary conditions of usage.

The treading surface of the outer rim may be arranged in any desired form to promote traction. It may be corrugated, roughened or otherwise arranged as may be preferred.

While the wheel comprising the parts as described is an efficient structure, we prefer to arrange two such wheels upon the same axle or even on an unusually wide felly as shown in Figs. 3 and 4, and to arrange them in such a manner, as clearly shown in Fig. 3 that the solid treading surface of the sections of the outer rim on one wheel shall be staggered with respect to the similar surfaces of the other wheel of the pair, and that each of such surfaces shall be alongside of a joint in the adjacent wheel.

In assembling the device an intermediate relatively thin rim indicated at 50 may be concentrically arranged between the felly and the inner rim. The cushions 40 are placed in position from the side of the wheel and are readily pressed inwardly from the outside, and when finally in place they abut against the annular flange 35. The sloping sides of the recesses in which they are placed effectually prevent any accidental displacement.

In use, as the wheel revolves under a load the treading sections of the outer rim come successively in contact with the surface traversed. They are each rigid on the surface, but under the load transmit the strains to the elastic cushions in turn to the inner rim. Flexible connections between the sections of the outer rim prevent rupture and promote ease of rotation.

The cushion may be readily renewed when worn, and so may any of the inner or outer rim sections.

It will of course be understood that variations may be made in the form and material of the parts without departing from the principles of the invention.

What we claim as new is:—

1. A wheel for vehicles comprising an annular felly, an annular rim surrounding the felly, and intermediate cushions connecting the felly and rim, the rim comprising sections of rigid material, links connecting said sections, and lugs projecting radially from the felly on opposite sides of the connecting links.

2. A wheel for vehicles comprising an annular felly having dovetailed recesses in its outer surface, an annular rim surrounding and spaced apart from the felly and having dovetailed recesses in its inner surface registering with the recesses of the felly, intermediate cushioning members engaging in said recesses and connecting the felly and rim, the rim being composed of sections, forked lugs extending annularly from adjacent sections, links connecting said lugs, and lugs projecting radially from the felly on opposite sides of the connecting links.

In testimony whereof we have affixed our signatures in presence of two witnesses.

ERNEST SIEGEL.
MICHAEL J. CANTOR.

Witnesses:
E. W. SCHERR, Jr.,
ALAN C. MCDONNELL.

---

Copies of this patent may be obtained for five cents each, by addressing the "Commissioner of Patents, Washington, D. C."